July 6, 1965 V. J. LUNDELL 3,192,881
MACHINE FOR WAFERING FORAGE CROP MATERIAL
Filed Oct. 22, 1963 2 Sheets-Sheet 1

INVENTOR.
VERNON J. LUNDELL
BY
Wolfe, Hubbard, Voit & Osann
ATTYS.

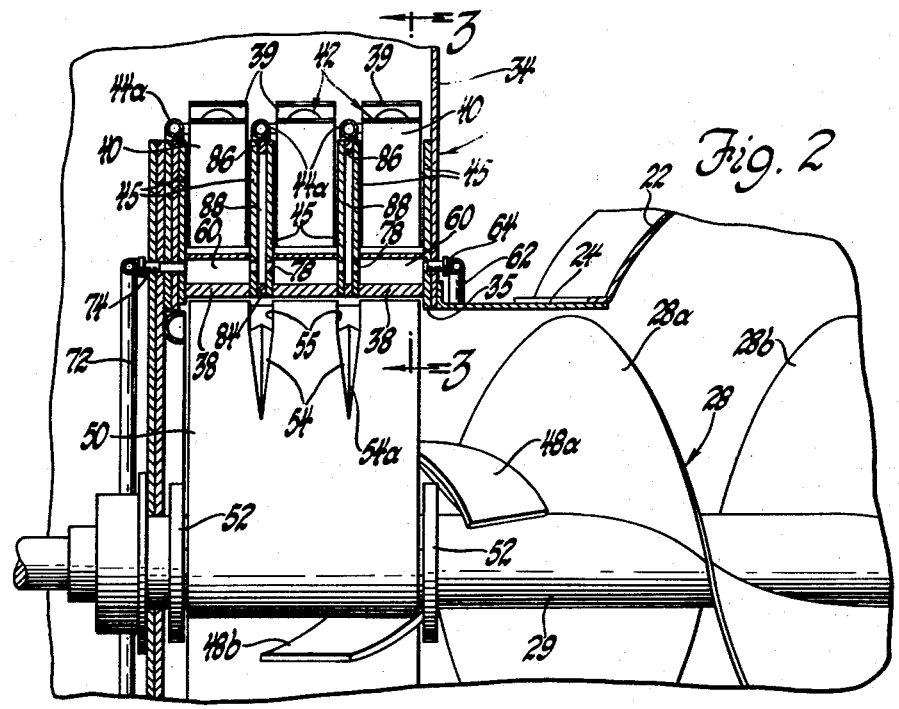
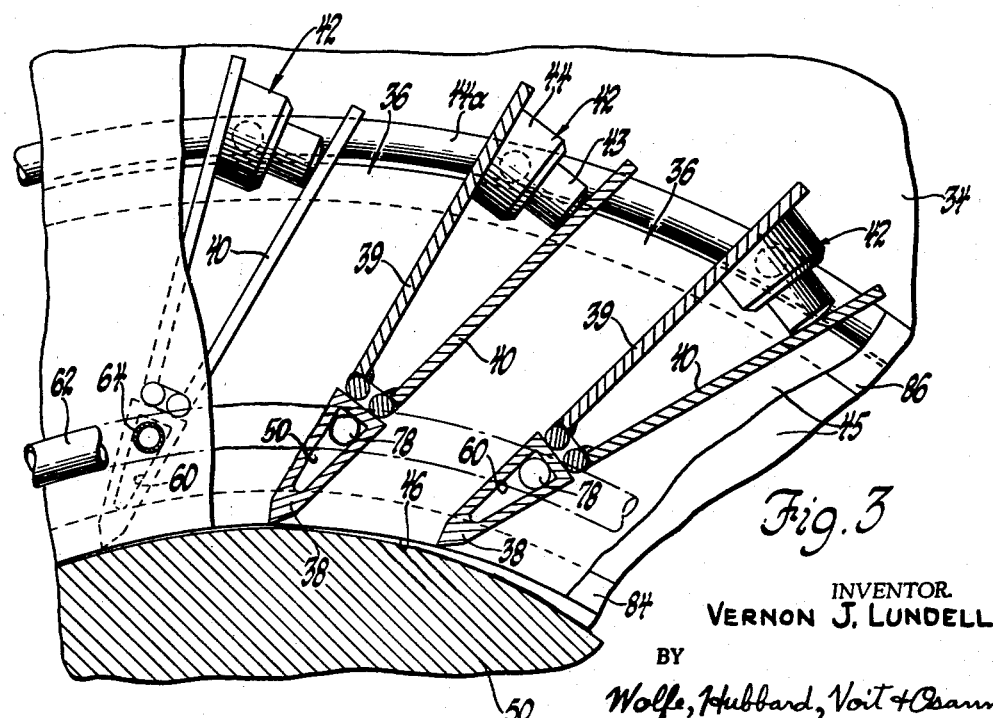

United States Patent Office 3,192,881
Patented July 6, 1965

3,192,881
MACHINE FOR WAFERING FORAGE CROP MATERIAL
Vernon J. Lundell, Cherokee, Iowa, assignor to Massey-Ferguson Services N.V., Netherlands Antilles, a corporation of the Netherlands Antilles
Filed Oct. 22, 1963, Ser. No. 317,999
6 Claims. (Cl. 107—14)

The present invention relates generally to agricultural machines of the type intended primarily for treating forage crops and concerns more particularly improvements in such machines for forming forage crop material into wafers.

Practical mobile wafering machines intended primarily for field operation include mechanism for compacting forage crop material into wafers and means for picking up the material from the field, chopping it and delivering the co-mingled or homogenized mass of comminuted stems and leaves to the wafering mechanism. Successful wafering is greatly affected by the moisture content of the crop material delivered to the wafering mechanism. Heretofore it has been the practice to allow sun and wind drying until the moisture content has become sufficiently reduced, usually to about twenty percent or less by weight. This practice is consuming of time, involves risk of spoilage and loss of nutrients.

The present invention concerns an improvement in a forage crop wafering mechanism having an annular arrangement of die cells of outwardly converging cross section and having rotatable pressing means for engaging comminuted crop material that is distributed about the die points at the entrance ends of the die cells to force the crop material into and through the cells so as to form it into compact wafers and including means for heating the die points to facilitate the formation of high quality wafers. In the preferred construction, the die points of the improved wafering mechanism are formed with hollow centers communicating with a source of heated fluid which serves to heat the die points. In a similar manner, the invention also contemplates the formation of the walls separating the die cells with hollow cores that also communicate with a source of heated fluid. The invention further includes provision for utilizing engine heat to initially pre-dry some of the excess moisture from the comminuted forage material prior to its entry into the wafering chamber.

An example of a wafering machine and mechanism embodying the present invention is shown by way of illustration in the accompanying drawings, in which:

FIG. 2 is a fragmentary, transverse sectional view taken through the wafering mechanism substantially in the plane of line 2—2 in FIGURE 1; and FIG. 3 is a fragmentary sectional view taken substantially in the plane of line 3—3 in FIG. 2.

Figure 1:
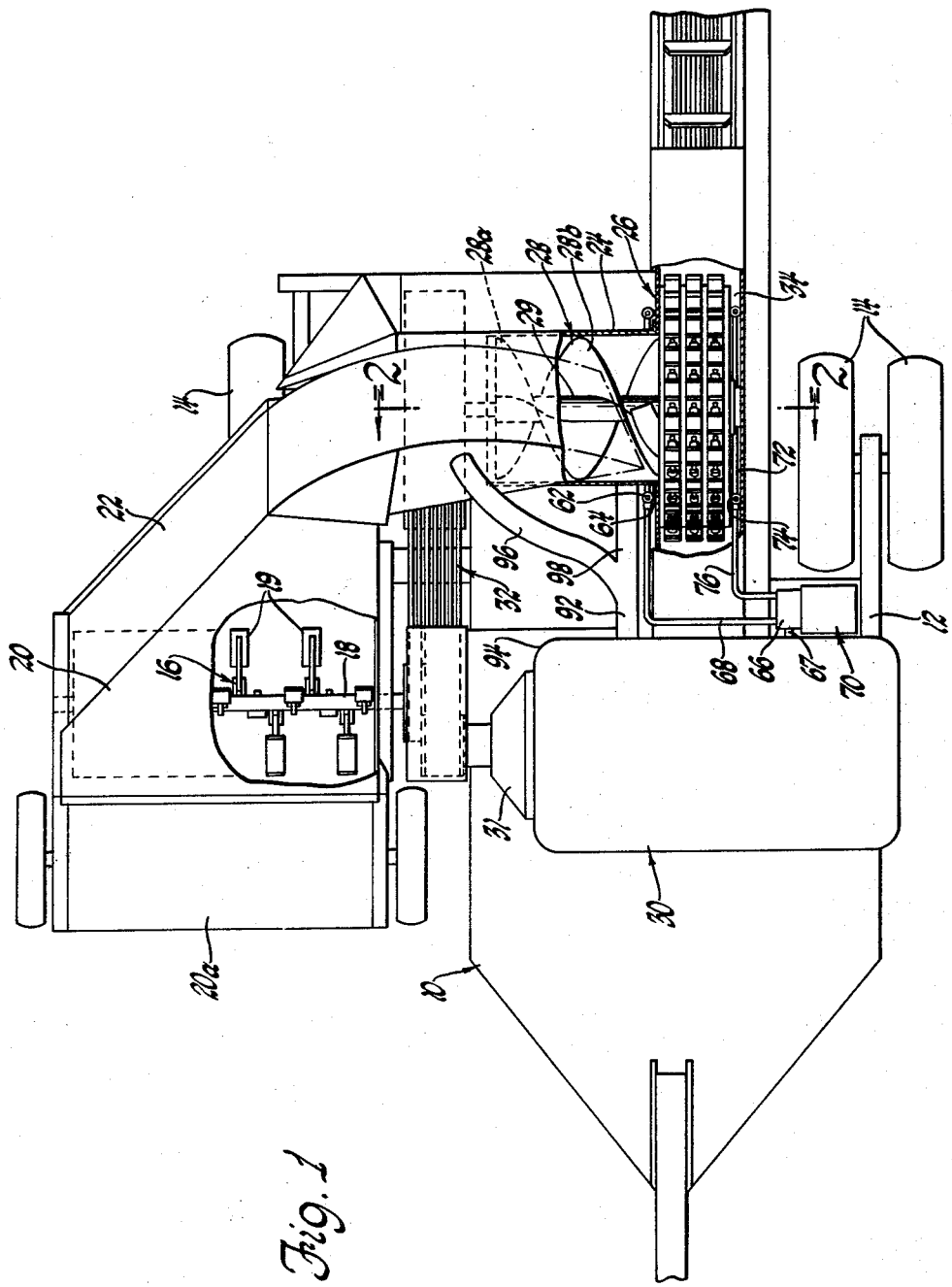
FIGURE 1 is a top plan view of the illustrative machine.

While the invention is illustrated and described in connection with a particular embodiment, it is not thereby intended that the invention be limited specifically to that embodiment. On the contrary, it is intended to embrace all modifications and alternative constructions falling within the spirit and scope of the invention as expressed in the appended claims.

Referring more particularly to FIGURE 1 of the drawings, there shown is a wafering machine indicated generally at 10. The wafering mechanism is mounted upon the rear end portion of a frame 12 which is equipped with ground engaging wheels 14 upon which the machine can be drawn through a field of hay or other forage crop. For cutting and comminuting the forage crop the illustrative machine is provided with a rotary flail 16. The flail is disposed adjacent the lower forward portion of the frame 12.

The flail 16 includes a transversely journalled central shaft 18 which mounts a series of blades 19. The outer end of each blade is of arcuate paddle form terminating at its outer end in a cutting edge. The blades 19 are pivoted upon the shaft 18 in longitudinally and angularly spaced relation so that, upon rotation of the shaft 18, the paths traversed by the paddle-like outer ends of the blades overlap. The flail shaft 18 is rotated in a direction so that the blade tips, in the lower portions of their paths, move in the direction of forward movement of the machine 10. Thus, they engage, cut, and lift the hay as the machine is drawn along a field.

The flail 16 is enclosed within a housing 20 having a generally forwardly projecting hood 20A which serves to prevent forward and outward tossing of the cut forage as it is engaged by the flail blades 19. Desirably, the flail shaft 18 and the blades 19 are rotated at relatively high speed so that the blades serve not only to pick up, cut and chop the hay, but by virtue of centrifugal force and fan action to throw the cut and comminuted crop material upwardly and rearwardly within the housing 20.

From the housing 20 the chopped and bruised crop material is received in an upwardly and rearwardly inclined chute 22 wherein co-mingling of the stems and leaves occurs. From the chute 22 the crop material is delivered into a hopper 24 that is disposed transversely upon the rear end portion of the frame 12 beneath the downwardly-directed upper end of the chute 22. From the hopper 24 crop material is transferred into a wafering mechanism which is indicated generally at 26. For this purpose the hopper has disposed therein a cross feed conveyor 28 formed of two helical auger flights 28a and 28b which are carried by and rotate with a shaft 29. The shaft 29 extends transversely through the hopper.

To drive both the shaft 29 and the flail shaft 18 the wafering machine 10 is equipped with its own power source. In the illustrative machine this power source comprises an internal combustion engine 30. Power from the engine 30 is delivered by way of a transmission 31 and a multiple drive-belt and pulley system 32 to the shafts.

The wafering mechanism 26 includes a housing defining a wafering chamber 34. As shown in FIG. 2, the housing has an opening 35 in its inner side wall which communicates with the hopper 24 and through which opening the cross feed conveyor 28 delivers the crop material.

The wafering mechanism 26 includes within the chamber 34 means defining a plurality of die cells 36 which are preferably disposed in annular array (see FIG. 3). The entrance ends of the cells 36 are defined by circumferentially spaced, sharpened tips 38 at the outer ends of which are pivoted longitudinal walls 39 and 40. The walls 39 and 40 are arranged in back-to-back diverging pairs, and means indicated generally at 42 is interposed between each pair for urging the juxtaposed cell wall faces toward each other. Thus the cells 36 are of converging cross section from their entrance ends toward their exit ends. As shown in FIG. 3, each of the means 42 comprises a pressure fluid actuated piston 43 and cylinder 44. Provision is also made for communicating the cylinders 44 to a common source of pressure fluid carried by a manifold pipe 44a.

In the present embodiment of the invention three sets of die cells 36 are provided which are arranged in side-by-side longitudinally spaced relation concentrically about the shaft 29. Defining the transverse sides of the die cells 36 are plates 45. The plates 45 are of annular form and together with the inner ends of the sharpened tips 38 define the inner extent of the die cells 36 and thus the limits of an extruder-feed chamber 46 of the wafering mechanism 26. It is into the chamber 46 that the comingled and comminuted crop material is delivered by the conveyor 28. Preferably the shaft 29 and the auger conveyor 28 are rotated at a relatively high speed. Such operation imparts a whirling motion to the mass of chopped crop material so that it is distributed, centrifugally, about the periphery of the extruder-feed chamber 46. To insure that the crop material is delivered into proximate juxtaposition with the openings or entrance ends of the die cells 36, the auger conveyor 28 is equipped with a pair of vanes 48a and 48b which are shown fixed to the terminal face portions of the flights 28a and 28b of the auger 28. As shown each of the vanes 48a and 48b is of arcuate form and extends into the chamber 46. Each vane presents a smooth outwardly facing forage-engaging surface generally oppositely disposed to the die cell entrances. Thus as the crop material is impelled into the chamber 46, it is engaged by the vanes and is urged by them toward the periphery of the chamber 46 over the die cell openings.

The wafering mechanism 26 includes means for forcing the crop material that is disposed about the extruder-feed chamber 46 and over the entrance ends of the die cells into the die cells and against the sharpened edges of the cell wall tips 38 to sever the hay that is forced into one cell from that in the next adjacent cells. For this purpose the exemplary machine utilizes a pair of pressure feet or skids 50 (only one of which is shown) carried by a frame 52 fixed to and rotatable with the shaft 29 within the extruder-feed chamber 46. Preferably, the outer surfaces of the skids are arcuate being spaced from the periphery of the extruder-feed chamber at their leading ends and increasing in radius so as to gradually approach and then extend generally concentric with respect to the periphery of the extruder-feed chamber 46 along the trailing portions of their surfaces and in proximate relation to the periphery of the chamber 46. Thus, after the crop material leaves the vanes 48a, 48b, it is almost immediately engaged by the leading portions of the outer surfaces of the skids 50 and is wedged outwardly toward the entrance ends of the die cells 36.

To sever crop material between adjacent sets of die cells 36 the outer surfaces of the skids are equipped with cutting ribs 54 for cooperation with the central ones of the side plates 45. Thus the ribs 54 are correspondingly spaced and are of triangular cross-section increasing in altitude, i.e., of increasing radial extent beyond the outer surfaces of the respective skids, so as to define a shearing edge 54a. The ribs 54 are of limited peripheral extent. To assist in clearing the crop material the ribs 54 terminate abruptly at their trailing ends and are succeeded by correspondingly disposed and spaced grooves 55 which are of gradually decreasing depth from their leading ends toward their trailing ends.

Pursuant to the present invention, the wafering mechanism 26 includes means for heating the comminuted crop material as it is being expressed into the die cells 36 by the pressure feet or skids 50. To this end, heat is conducted to each of the die points 38 adjacent the entrance ends of the die cells 36. In the preferred construction, the die points 38 are each formed with a hollow center portion or core 60 into which a heated fluid is delivered to heat the die points. The heating of the die points in this manner serves to facilitate the formation of high quality wafers from a forage crop material as it is expressed through the die cells 36.

For delivering heated fluid to the hollow die points 38, a delivery manifold 62 is disposed adjacent the wafering mechanism 26 with a plurality of nipples 64, respectively communicating with the hollow cores 60 of the die points. As shown in FIG. 1 of the drawings, a pump 66 and delivery line 68 couple the delivery manifold 62 to a heat source indicated generally at 70. The pump 66 is preferably driven by the engine 30 through a suitable drive shaft 67 or the like. It will be understood, of course, that the heat source 70 may comprise any well known fluid heating means, such as a hot water heater, a steam generator, hot air furnace, or the like. In the latter event, it will be further understood that the pump 66 may take the form of a hot air fan.

To insure adequate circulation of the heating fluid through the hollow die points 38, a collecting manifold 72 is provided with a plurality of nipples 74 which exhaust the fluid from the hollow die cores 60 into the collecting manifold 72. A return line 76 coupled to the low pressure side of the pump 66 recirculates the fluid from the collecting manifold 72 to the heat source 70. As shown in FIG. 2, suitable apertures 78 formed in the central die cell walls 45 permit the free flow of heated fluid between the hollow cores 60 of the die points 38 in the three annular arrays.

It is a further feature of the present invention that means are provided for heating the annular plates 45 which separate the longitudinally spaced die cells 36 in the three separate annular arrays. To this end, it will be seen that the plates 45 forming the side walls of the center array of die cells 36 are separated from the plates forming the inner side walls of the outer die cell arrays by means of a pair of annular spacer means 84 and 86. The annular ring 84 thus sealingly closes the space between a pair of adjacent plates 45 at the inner periphery thereof, and similarly, the annular spacer ring 86 closes the space between the plates 45 at the outer periphery thereof. As previously mentioned, the plates 45 are provided with suitable apertures 78 to communicate the heated fluid between the cores 60 of the adjacent die points 38. These same apertures also communicate the heated fluid to the hollow annular core or space 88 defined between the adjacent central plates 45 and the spacer rings 84, 86.

According to another aspect of the present invention, means are also provided for heating the comminuted crop material before it is delivered into the extruder-feed chamber 46. For this purpose, a suitable conduit 92 is coupled to an external cover 94 which houses the engine 30. The cover 94 thus serves as a shroud over the internal combustion engine 30, and the waste engine heat from the engine is delivered through the conduit 92 to partially pre-dry the comminuted crop material. Preferably, the conduit 92 divides into two separate branches 96 and 98 communicating respectively with the upper portion of the chute 22 and the hopper 24. In this way, engine heat is delivered to the comminuted forage material as it is blown into the hopper 24 by the rotary flail 16, and additional engine heat is directed to the crop material being carried by the auger 28 into the extruder-feed chamber 46.

From the above, it will be appreciated that the present invention provides an improved hay wafering machine 10 which incorporates means for heating the hollow die points 38 and the central die cell walls 45 to heat the crop material being extruded through the die cells 36. The invention also provides for utilizing waste engine heat to partially pre-dry the comminuted crop material being delivered to the extruder-feed chamber 46. By heating the crop material in this way it will be appreciated that forge crop material having a relatively high moisture content may be harvested by the wafering machine 10 and compacted into high quality wafers without the risk of spoilage and loss of nutrients associated with field drying the crop material to a moisture content of twenty percent or less by weight, as formerly required.

I claim as my invention:

1. In a forage crop wafering machine having an extruder-feed chamber for receiving and wafering comminuted crop material, the combination comprising, an annular array of die cells of outwardly converging cross section disposed within said extruder-feed chamber, said die cells being separated at the entrance ends thereof by sharp edged die points and having movable wall portions adjacent the exit ends thereof, said die points each being formed with a hollow center portion, means for engaging the comminuted crop material delivered to said chamber adjacent the entrance ends of said die cells to force the crop material into and through said die cells so as to form it into compact wafers, and means for communicating a heated fluid to said hollow die points to facilitate the formation of high quality wafers from said forage crop material.

2. The combination according to claim 1 including a source of heated fluid and an annular manifold for communicating heated fluid to each of said hollow die points from said source of heated fluid.

3. The combination according to claim 1 wherein a plurality of annular arrays of die cells are disposed within said extruder-feed chamber with said arrays arranged in coaxial longitudinal spaced relation to each other, said annular arrays of die cells being separated by annular side walls having hollow center cores and means are provided for communicating a heated fluid to said hollow side wall cores.

4. The combination according to claim 3 wherein an annular manifold is provided for communicating a heated fluid to one of said annular arrays of hollow die points and said hollow side walls are provided with means for communicating said heated fluid from said one annular array of hollow die points to an adjacent annular array of said hollow die points.

5. In a forage crop wafering machine having a rotary-flail type pick-up and a wafering mechanism including an extruder-feed chamber, the combination comprising, an internal combustion engine mounted on said machine for driving said pick-up and said wafering mechanism, means including a chute for delivering air and comminuted crop material into said chamber from said pick-up, a source of heated fluid mounted on said machine, an annular array of die cells of outwardly converging cross section disposed within said extruder-feed chamber, said die cells being separated at the entrance ends thereof by sharp edged die points and having movable wall portions adjacent the exit ends thereof, each of said die points being formed with a hollow center portion, rotatable pressing means for engaging the comminuted crop material delivered to said chamber adjacent the entrance ends of said die cells to force the crop material into and through said die cells so as to form it into compact wafers, means coupled between said engine and said chute for communicating waste heat from said engine into said chute so as to partially pre-dry said comminuted crop material being delivered from said pick-up to said wafering mechanism, and means including an annular manifold for communicating heated fluid to each of said hollow die points from said source of heated fluid.

6. The combination according to claim 5 including a pump for delivering the heated fluid from said source to said manifold and hollow die points, said pump being driven by said engine on said machine.

References Cited by the Examiner

UNITED STATES PATENTS

| 638,238 | 12/99 | Haley et al. | 146—130 |
| 1,058,363 | 4/13 | Gray | 83—171 X |
| 1,343,932 | 6/20 | Raia | 83—71 |
| 2,603,170 | 7/52 | Meakin | 107—8.35 |
| 2,647,474 | 8/53 | Popick | 107—14 |
| 2,764,952 | 10/56 | Meakin | 107—14 |
| 2,942,976 | 6/60 | Kosch | 99—8 |
| 3,075,456 | 1/63 | Uschmann | 100—138 |

FOREIGN PATENTS 1,250,174  11/60  France.

OTHER REFERENCES

Agricultural Engineering, S. 671. A3, August 1961, 56/1, pages 412–415 and 423.

WALTER A. SCHEEL, *Primary Examiner.*